United States Patent [19]
Pringle et al.

[11] Patent Number: 5,311,747
[45] Date of Patent: May 17, 1994

[54] WATER-ASSISTED CONDENSER COOLER

[76] Inventors: Robert D. Pringle, R.R. 1, Baldwin, Kans. 66006; John Prikkel, III, 2952 Ensley Ave., Dayton, Ohio 45414

[21] Appl. No.: 906,381

[22] Filed: Jun. 30, 1992
(Under 37 CFR 1.47)

[51] Int. Cl.⁵ ............................................. F25B 39/04
[52] U.S. Cl. ........................................ 62/183; 62/506
[58] Field of Search .................. 62/183, 184, 506, 507

[56] References Cited
U.S. PATENT DOCUMENTS

| | | | |
|---|---|---|---|
| 2,231,856 | 2/1941 | Wetter | 62/184 X |
| 2,278,242 | 3/1942 | Chapman | 62/183 X |
| 2,438,120 | 3/1948 | Freygang | 62/183 X |
| 2,655,795 | 10/1953 | Dyer | 62/183 X |
| 2,664,715 | 1/1954 | Borgerd | |
| 3,613,392 | 10/1971 | Di Tucci | 62/184 |
| 4,516,406 | 5/1985 | Gentry et al. | 62/183 |

Primary Examiner—William E. Tapolcai
Attorney, Agent, or Firm—D. A. N. Chase; Michael Yakimo, Jr.

[57] ABSTRACT

A sprinkler system for a condenser unit of an air conditioning system comprises a flue with a temperature responsive valve assembly releasably mounted therein. The flue is mounted atop the protective grill for the system fan so as to channel a portion of the fan's cooling air flow for the condenser therethrough. A bellows senses temperature changes in this air flow and upon a selectable rise in temperature expands so as to urge the valve stem of a two-way poppet valve to a valve opening position. The open valve, connected to a water source, delivers water to an elongated fluid outlet line which is fastened along the grill surrounding the condenser unit. The elongated line comprises a plurality of segments connected by intermediate spray heads. The spray heads circumscribe the condenser with a cooling spray so as to reduce the temperature of the same.

10 Claims, 2 Drawing Sheets

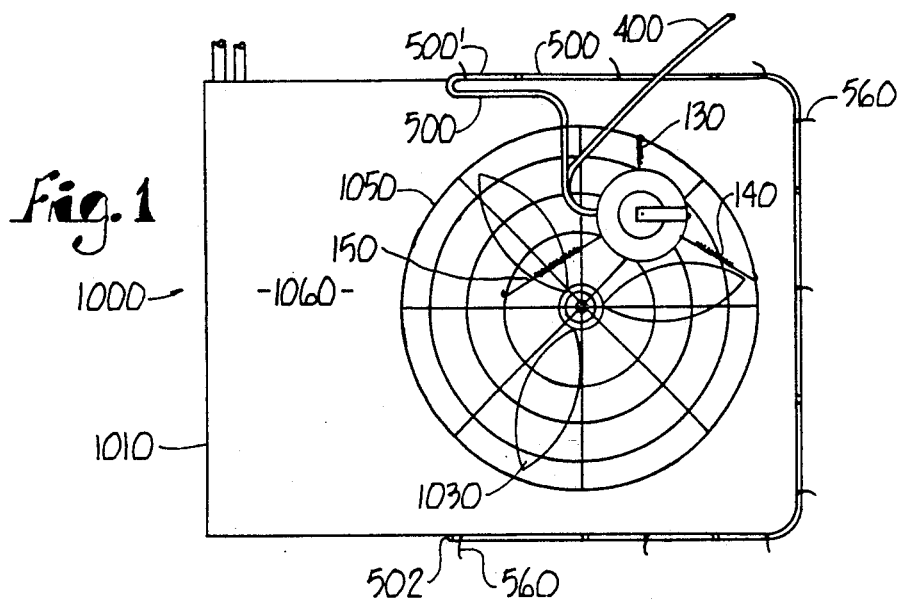
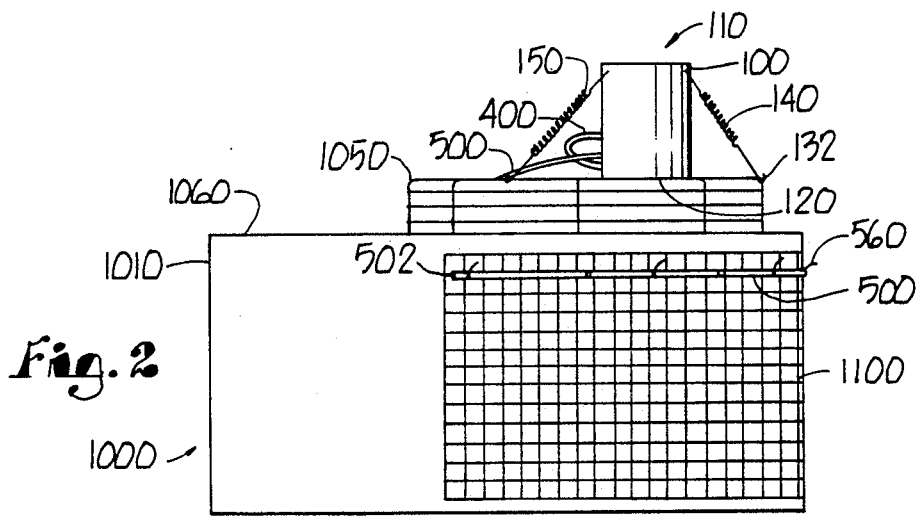
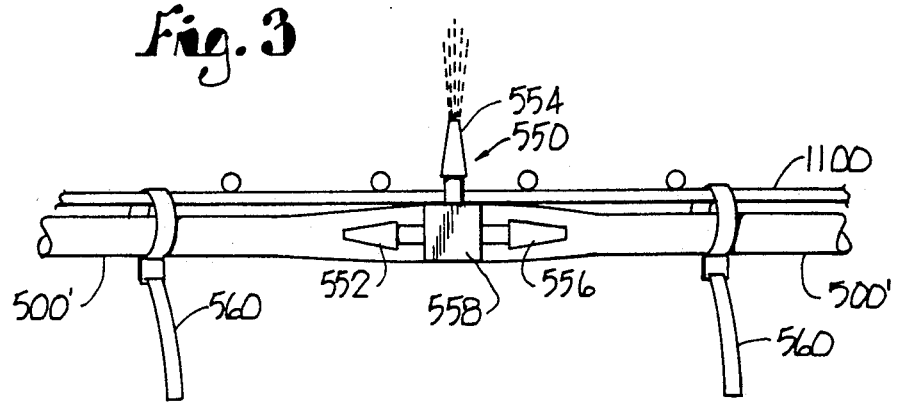

WATER-ASSISTED CONDENSER COOLER

BACKGROUND OF THE INVENTION

This invention generally relates to a cooling system for an air conditioning system, and more particularly, to a sprinkler system for discharging a water spray on a condenser unit or the like.

During extensive use of an air conditioning system, particularly during hot weather, the condenser unit of the system may become heated to the point that it decreases the system's efficiency and/or overheats to the point of failure. Accordingly, it is desirable to utilize a sprinkler system to cool the condenser unit so as to maintain its effectiveness and/or prevent overloading.

A known spray system employs a control valve mounted atop a condenser unit. The valve utilizes a fluid-filled chamber in a heat exchange relationship with the condenser proper. Upon the fluid being heated to a certain temperature, the valve opens which causes a discharge of water from a nozzle onto the unit.

Although assumably effective in operation, we desire to have a system which is responsive to the temperature of the air being drawn/passed over the condenser unit as such temperature is believed to be more indicative of whether the condenser needs to be cooled by the spray system. Also, the spray from a single nozzle in the above known device discharges the water onto a limited area of the condenser. It is much more desirable to surround the condenser with a cooling spray so as to cool all portions of the condenser unit. Finally, unlike the previous system, our system allows for an easy interchange of the valve assembly according to the application at hand.

In response thereto we have invented a sprinkler system for cooling a condenser unit or the like which mounts a flue atop the condenser housing for channeling therethrough a portion of the air being passed across the condenser unit by a system fan. Within the flue is releasably mounted a valve assembly having a thermally responsive bellows for controlling a reciprocative movement of a valve stem of a two position poppet water valve. The bellows moves between contracted and expanded modes according to the sensed air flow temperature within the flue. This reciprocative motion of the valve stem closes and opens the valve to regulate a flow of fluid from an inlet line to an elongated outlet line. The outlet line is fastened to the grill surrounding the condenser unit and includes a plurality of tubular segments connected by spray nozzles protruding through the grill. This configuration surrounds the condenser unit with a water spray upon the bellows sensing a selectable temperature of air passing through the flue. The resulting reduction in temperature enhances the effective operation of the associated air conditioning system.

It is therefore a general object of this invention to provide a sprinkler system for cooling an air conditioning system or the like.

Another object of this invention is to provide a sprinkler system, as aforesaid, which uses a thermally responsive valve assembly for regulating the delivery of a cooling spray onto an air conditioning system.

A still further object of this invention is to provide a sprinkler system, as aforesaid, which utilizes a valve assembly, as aforesaid, which is easily replaced and/or modified according to the job application at hand.

Another further object of this invention is to provide a sprinkler system, as aforesaid, which provides a fluid outlet line for surrounding a condenser unit of an air conditioning system with a cooling spray.

A particular object of this invention is to provide a sprinkler system with outlet line, as aforesaid, which is made of a plurality of flexible tubular segments connected by a plurality of spray nozzles.

Still another particular object of this invention is to provide a sprinkler system, as aforesaid, which senses the temperature of a portion of the cooling air being passed over the condenser during system operation.

A still more particular object of this invention is to provide a flue with valve assembly, as aforesaid, which channels a portion of the cooling air flow therethrough for sensing the temperature of the same.

Another object of this invention is to provide a sprinkler system, as aforesaid, which provides a cooling spray onto the system at user-selectable temperatures.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is a top plan view of the housing about the condenser unit illustrating the attachment of the flue with valve assembly therein to the grill atop the condenser fan.

FIG. 2 is a side elevation view of the housing in FIG. 1 illustrating the attachment of the fluid outlet line to the grill about the condenser unit.

FIG. 3 is a top fragmentary view, on an enlarged scale, of the outlet line attached to the grill and showing the T-shaped fluid connectors joining adjacent segments of the fluid outlet line.

DESCRIPTION OF THE PREFERRED EMBODIMENT

Figure 4:
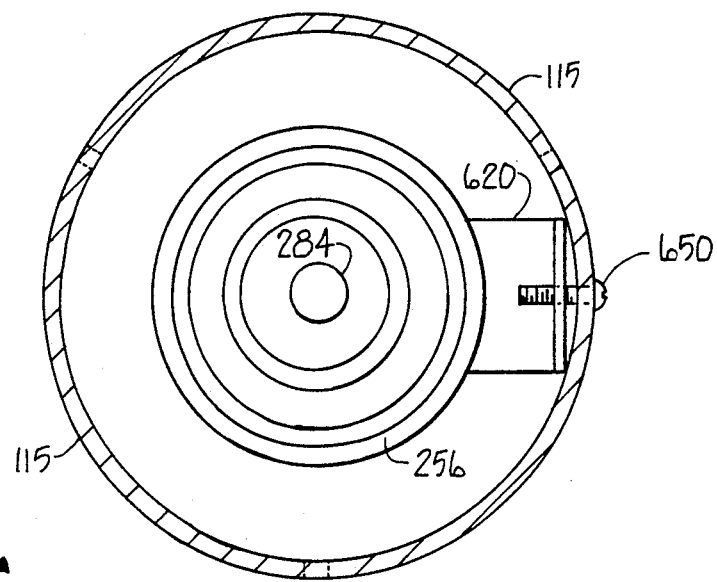
FIG. 4 is a horizontal sectional view taken along line 4—4 in FIG. 5.

Turning more particularly to the drawings, FIG. 1 illustrates the outside unit 1000 of a conventional home air conditioning system. As shown the unit 1000 generally comprises a housing 1010 enclosing the condenser, compressor and fan 1030. A grill 1050, positioned in the top wall 1060 of the housing 1010, overlies the fan 1030 and a side grill 1100 surrounds the condenser unit. It is understood that the particular unit 1000 shown is for the purpose of illustration and not limitation.

Positioned atop the fan grill 1050 is a cylindrical flue 100 having upper 110 and lower 120 open ends. A plurality of tie down springs 130, 140, 150 are connected in tension at one end to the flue 100 with the lower end of each spring 130, 140, 150 being releasably attached to the fan grill 1050 by hooks 132 or the like. Upon such connection, the flue 100 is positioned atop the fan grill 1050. This abutting position allows for a portion of the cooling air flow, as drawn by the fan 1030 over the condenser, to be channeled through the flue 100.

Figure 5:
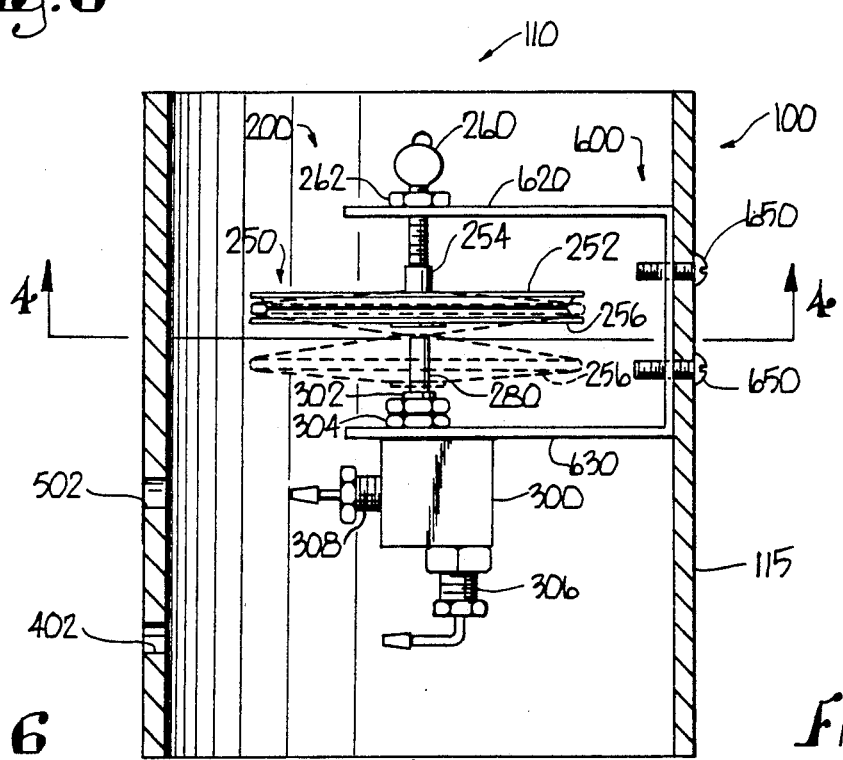
FIG. 5 is a vertical sectional view, on an enlarged scale, of the flue with a valve assembly therein and showing in phantom lines the expanded position of the thermally responsive bellows.

As best shown in FIG. 5, the flue 100 contains a valve assembly 200 for controlling the flow of a cooling fluid, e.g. water, between an inlet 400 and a condenser-surrounding outlet line 500. The valve assembly 200 generally comprises a thermally responsive expansion bellows 250 for controlling the direction of travel of a stem 280 of a two-way poppet valve 300. (One poppet valve used is a Clippard Minimatic MJV-2.) The poppet valve 300 is normally closed when the stem 280 is in its biased, extended FIG. 4 and FIG. 6 positions.

The valve assembly 200 is mounted within the flue 100 by means of a U-shaped bracket 600 attached to a flue wall 115 by screws 650 or the like.

Figure 6:
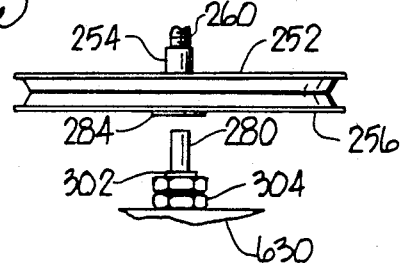
FIG. 6 is a diagrammatic view showing the contracted mode of the bellows.
Figure 7:
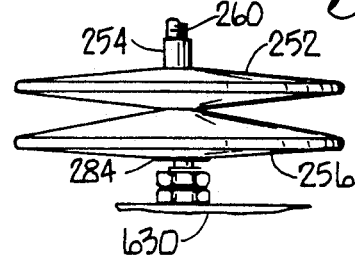
FIG. 7 is a diagrammatic view showing the expanded mode of the bellows.

The bellows 250 contains an ether gas which upon heating expands from a FIG. 6 normal contracted mode to a FIG. 7 expanded mode. Bellows 250 is mounted between the upper 620 and lower 630 horizontally extending mounting plates of bracket 600 by means of an elongated thumb screw 260 extending through an aperture in the upper mounting plate 620. The screw 260 is threadably adjustable relative to the plate 620 and is held in a desired position by locking nut 262. The free end of the screw 260 engages a collar 254 mounted atop the top surface 252 of the bellows 250. Thus, the position of the bellows 250 between bracket plates 620, 630 is adjustable and maintained by manipulation of the thumb screw 260/locking nut 262 combination.

The poppet valve 300 includes a threaded fitting 302 extending through an aperture in the lower mounting plate 630. Lock nuts 304 engage the fitting 302 so as to secure valve 300 to the mounting plate 630. As such the valve stem 280 extends towards the bottom surface 256 of bellows 250. At this normal position of stem 280 the valve 300 is closed precluding a fluid flow between the inlet and outlet fluid ports as presented by fittings 306, 308.

Extending through flue aperture 502 and attached at on end to the outlet fitting 308 of valve 300 is the elongated outlet line 500 (removed from FIG. 5 for clarity). The outlet line 500 includes a plurality of tubular segments 500' (FIG. 3) connected by intermediate fluid connectors designated as T-heads 550. Each T-head 550 includes in-line inlet 552 and outlet 556 nozzles, with an intermediate spray nozzle 554 extending outwardly at a right angle from block 558. The adjacent ends of upstream and downstream outlet line segments 500' are press fitted over the opposed in-line nozzles to encompass the inlet 552 and outlet nozzles 556 therein. A plurality of ties 560 fasten the connected tube segments 500' to the grill 1100 surrounding the condenser unit as shown in FIG. 2. At this position the spray nozzles 554 of each T-head 550 extend through the grill 1100 and towards the encompassed condenser unit. As shown in FIG. 1 it is preferred that the outlet line 500 is connected about the entire grill 1100. The terminal end 502 of outlet 500 is plugged so that all water passing through outlet line 500 is discharged from the spray nozzles 554 of the plurality of the T-heads 550.

In use one end of the inlet line 400 extends through flue aperture 402 and is connected to the inlet fitting 306 with the other end being attached to a water source, e.g. a garden hose connected to the outside water faucet. Upon system operation cooling air is drawn over the condenser unit by fan 1030. The air undergoes a heat exchange with the unit and passes through grill 1050 with a portion of the air being channeled through the flue 100. The ether in the bellows 250 is thermally responsive to a preselected temperature change of this channeled air flow.

The normal or contracted mode of bellows 250 is shown in solid lines in FIGS. 5 and 6. The expanded mode is shown in phantom lines in FIG. 5 and in solid lines in FIG. 7. These modes are achieved by expansion and contraction of the ether gas within bellows 250 as primarily caused by a heat exchange of the internal ether with the air passing through flue 100. Upon the expansion of the bellows 250 towards its FIG. 5 phantom line or FIG. 7 positions, due to an increase in the air temperature, the circular contact plate 284 on lower surface 256 drives the valve stem 280 into the poppet valve 300 so as to urge the valve 300 from a normally closed towards an open position. The plate 284 on surface 256 abuts the fitting 302 at the end of stem 280 travel. Accordingly, during bellows 250 expansion an increase in stem travel will cause an increase in water flow between the inlet 306 and outlet 308 fittings. The resulting fluid flow through the outlet line 500 flows through the inlet 552 and outlet 556 nozzles of the plurality of T-heads 550. Concurrently, water is also discharged from the spray nozzle 554 of each T-head 550 and onto the condenser unit. Thus, the condenser unit is surrounded by a cooling spray due to the circumscription of the outlet line 500.

Upon cooling of the condenser a decrease in the air temperature of the air flow being passed across the condenser unit 1030 will occur. This temperature decrease is sensed by the ether in bellows 250 so as to return the same towards its contracted FIG. 6 position. Concurrently, the stem 280 is biased towards its normal position so as to close the valve 300 and cease the flow between the inlet 306 and outlet 308 ports. This reciprocative action of the bellows 250 and valve stem 280 will continue as the temperature of the air flow changes throughout the use of our device.

It is herein noted that various bellows 250 responsive to selected temperature ranges can be used. For example, the bellows 250 may begin to respond at 90° F., engage stem 280 at 95° F. and fully open the valve 300 at a temperature of 110° F. Also, the use of the thumb screw 260 and locking nut 262 allow for modification of the distance between the bellows 250 and stem 280. Thus the length of the throw of the bellows 250 before it contacts valve stem 280 can be adjusted. In turn, various adjustments with bellows type and/or throw length can be made so as to selectably vary the temperatures at which the valve 300 is opened and closed. These capabilities allow for our sprinkling system to be used in various applications and/or with various bellows and water valves.

Although one form of this invention has herein been illustrated and described, it is noted that our invention is not limited thereto except as set forth in the following claims and allowable functional equivalents thereof.

Having thus described the invention what is claimed as new and desired to be secured by Letters Patent is as follows:

1. A fluid cooling apparatus for a condenser unit or the like comprising:
   a flue;
   means for mounting said flue in a position adjacent the condenser unit for channeling a portion of an air flow passing over the condenser unit therethrough;

a valve assembly for regulating the flow of a fluid between a fluid inlet and a fluid outlet, said valve assembly including structure responsive to the temperature of the air in said flue;

means for mounting said valve assembly within said flue means;

an elongated fluid outlet line connected to said fluid outlet;

means for mounting said fluid line about said condenser unit; and means for discharge of the fluid in said outlet line onto the condenser unit.

2. The apparatus as claimed in claim 1 wherein said valve assembly comprises:

a thermally responsive bellows having a first contracted mode at a first air temperature and a second expanded mode at a higher air temperature;

a valve body having a first normally closed position and a second open position;

a valve stem extending from said valve body and having a free end adjacent said bellows;

said bellows urging said valve stem to a valve opening position during movement of said bellows from said contracted to said expanded modes, whereby to deliver a fluid from said flue inlet to said flue outlet line.

3. The apparatus as claimed in claim 2 wherein said flue mounting means comprises:

a bracket having a first mounting plate and a second mounting plate with a spanning web therebetween;

means for mounting said web to said flue;

means for fastening said bellows to said first mounting plate;

means for fastening said valve body to said second mounting plate with said valve stem extending towards said bellows.

4. The apparatus as claimed in claim 3 wherein said bellows mounting means comprises:

an elongated screw having first and second ends, said screw extending through said first mounting plate;

means for connecting said second end of said screw to said bellows, said screw being threadably adjustable relative to said first mounting plate to position said bellows in said contracted mode at a selectable distance relative to said free end of said valve stem; and means for fixing said screw at said relative position, whereby to maintain said contracted bellows at said selectable distance relative to said valve stem.

5. The apparatus as claimed in claim 1 wherein said fluid outlet line comprises a plurality of tubular segments with said fluid discharge means comprising:

a plurality of spray heads with each head comprising inlet and outlet fluid nozzles with an intermediate spray nozzle, each of said tubular segments presenting a free end for fitting over said inlet or outlet nozzles, whereupon said inlet and outlet nozzles communicate the fluid between adjacent tubular segments with a discharge of a portion of the fluid from said intermediate spray nozzle.

6. The apparatus as claimed in claim 5 wherein the condenser unit is surrounded by a grill, said fluid line mounting means comprising a plurality of fasteners for attaching said tubular segments to the grill with each spray nozzle extending through the grill and towards the condenser.

7. The apparatus as claimed in claim 1 wherein a fan with a protective grill passes the air flow over the condenser, said flue mounting means comprising:

a plurality of ties having first and second ends with said first end of each tie attached to said flue;

means at said second end of each tie for attaching said flue to said fan grill and in the path of the air flow.

8. The apparatus as claimed in claim 7 wherein said tie attaching means comprises a hook for releasable attachment of said tie second end to the fan grill.

9. The apparatus as claimed in claim 7 wherein each of said ties comprises a spring, said attached spring biasing said flue towards the grill.

10. A sprinkler system for a condenser unit or the like comprising:

flue means for directing an air flow forced over the condenser unit therethrough;

a fluid valve assembly mounted within said flue means for regulating a delivery of a fluid onto the condenser unit, said assembly including:

an inlet line for delivering the fluid from a fluid reservoir, a fluid outlet line, a valve for regulating the fluid flow between said fluid lines, said valve having a first closed position and a second open position, an associated valve stem having first and second ends, drive means responsive to a temperature of the air flow in said flue means, said drive means including thermally responsive structure having a first contracted mode at a first temperature and a second expanded mode at a second temperature, and means for positioning said first end of said valve stem adjacent said drive means structure, whereupon movement of said drive means structure between said contracted and expanded modes moves said valve stem in a manner to close and open said valve;

means for positioning said outlet line about the condenser unit; and means along the extent of said outlet line for discharge of the fluid in said outlet line onto the condenser unit.

* * * * *